United States Patent [19]

Spitzer

[11] 4,227,514
[45] Oct. 14, 1980

[54] SOLAR ENERGY COLLECTORS

[76] Inventor: Hermann J. Spitzer, 8004 Arcarde St., Lorton, Va. 22079

[21] Appl. No.: 958,475

[22] Filed: Nov. 7, 1978

Related U.S. Application Data

[62] Division of Ser. No. 732,696, Oct. 14, 1976, Pat. No. 4,158,355.

[51] Int. Cl.³ .................................................. F24J 3/02
[52] U.S. Cl. .............................. 126/426; 126/445; 126/448; 126/900
[58] Field of Search .............. 126/426, 444, 445, 448, 126/450, 900, 442, 443

[56] References Cited

U.S. PATENT DOCUMENTS

| | | | |
|---|---|---|---|
| 3,022,781 | 2/1962 | Andrassy | 126/426 |
| 3,029,806 | 4/1962 | Okuda | 126/426 |
| 3,076,450 | 2/1963 | Gouch et al. | 126/444 |
| 3,399,664 | 9/1968 | Suhay | 126/450 |
| 3,859,980 | 1/1975 | Crawford | 126/426 |
| 3,868,945 | 3/1975 | Konopka et al. | 126/426 |
| 3,939,819 | 2/1976 | Minardi | 126/448 |
| 3,943,911 | 3/1976 | Yu | 126/450 |
| 3,965,887 | 6/1976 | Gramer et al. | 126/444 |
| 4,038,967 | 8/1977 | Stout et al. | 126/426 |
| 4,062,351 | 12/1977 | Hastwell | 126/450 |
| 4,111,186 | 9/1978 | Ross | 126/426 |
| 4,146,012 | 3/1979 | Elkins | 126/426 |
| 4,158,355 | 6/1979 | Spitzer | 126/450 |

*Primary Examiner*—James C. Yeung
*Attorney, Agent, or Firm*—Nathan Edelberg; Robert P. Gibson

[57] ABSTRACT

This invention utilizes a solar radiation absorbing fluid (i.e., a black fluid) for direct solar energy to thermal energy transfer. The unique structure of the several disclosed embodiments of this invention provides for a selected distribution and a selected depth of the absorbing fluid in the solar energy exposed area.

The disclosed apparatus converts solar radiation energy into thermal energy with higher conversion efficiency, lower material and manufacturing costs and considerable weight reduction compared to conventional solar collectors.

1 Claim, 9 Drawing Figures

PENETRATION DEPTH

SOLAR ENERGY COLLECTORS

The invention described herein may be manufactured, used, by or for the Government for Governmental purposes without the payment to me of any royalties thereon.

This is a division of application Ser. No. 732,696 filed Oct. 14, 1976 now U.S. Pat. No. 4,158,355.

BACKGROUND OF THE INVENTION

This invention relates to solar energy collectors for converting solar energy to thermal energy, and more particularly, to solar energy collectors in which a black fluid is used as the absorber and as the heat carrier.

Solar energy collectors for converting solar energy to thermal energy are well known in the art and many various different types of such collectors are disclosed in the prior art. Generally, such absorbers utilize thin black surfaces coated on a heat conducting metallic substrate such as copper, aluminum or steel. The thin surface coating which is absorbing in the wavelength of the solar spectrum converts the solar energy to thermal energy which is transferred into and through the metallic substrate into a flowing fluid, usually water or a mixture of water and an anti-freeze. This flowing fluid provides the necessary temperature differential gradient and is used to transport the thermal energy to the point to use.

Recently, solar collectors have been introduced which provide an improvement over the above described prior art devices by replacing the thin absorbing coating and metallic substrate with a heat absorbing black fluid which functions as both the absorber and the medium for transporting the thermal energy to the point of use. It will be appreciated that the substitution of a black fluid in solar collectors of conventional design may be advantageous and that solar collectors especially designed for black fluid use may afford optimum advantage.

SUMMARY OF THE INVENTION

This invention provides solar energy flat plate collectors of unique configuration wherein the solar energy absorber and thermal energy carrier is a radiation absorbing fluid. The collector hardware consists of a minimal number of components which are readily available or easily fabricated and of reasonable cost. The radiation absorbing fluid consists of suitable carrier liquid containing suspended, dispersed or dissolved radiation absorbing materials which are active in the total range of the solar spectrum and therefore appear optically black. The carrier liquid can be water or water mixtures with organic liquids such as ethylene glycol or glyzerin, which are added for the purpose of lowering the freezing point or raising the boiling point, or it can be any suitable oil, like silicone oil. The radiation absorbing materials added to the carrier liquid may consist of carbon or metal blacks or compounds and dyes usually containing metallo-complex groups which act as radiation absorption centers.

A typical example of a fluid that has been used and operates satisfactorily at low temperatures is China ink. China ink normally consists of Carbon plus a binder suspended in water. For high temperature operation water solutions and dispersions of Acidol and Vialon dyes have been successfully used (recorded in the International Color Index as No. 187, No. 194 No. 63). One of the most important features of the collector of this invention is that the absorption center density or concentration in regard to the collector geometry may be chosen in such a way as to allow essentially total absorption by the fluid. Some absorption by the intermediate glass covering is inherent, of course, but such intermediate surface absorption should be minimized as it is efficiency derating.

It will be appreciated that relatively complex thermal considerations are involved in each disclosed embodiment of this invention. In general dissertation, however, radiation incident on any medium will be partly reflected and the rest whose radiation intensity shall be $\phi_o$ will penetrate the medium. If $\phi_o$ does not change with penetration depth, the medium is called transparent. If the radiation intensity decreases, the medium is called absorbing. In absorption, radiation energy is literally destroyed and converted into thermal energy. In the present invention, of course, where the fluid is the absorbing medium, depth of the fluid is a significant consideration.

The absorption coefficient of the fluid medium in this invention is especially significant for optimum design of the solar collector. It will be seen that radiation intensity $\phi$ decreases with increasing depth l, from the surface of the medium. If we assume the radiation intensity to be $\phi$ at the depth l, then it will change to $\phi - (d\phi/dl)dl$ at $l+dl$. This means the decrease of intensity per unit length is $-d\phi/dl$, which in turn is proportional to the instant intensity $\phi$, or $-(d\phi/dl) = K\phi$ (l) $d\phi/\phi = -Kdl$ (for $K>0$). Intergration results in: $l_n\phi = l_n\phi_o - Kl$, or $\phi = \phi_o e^{-Kl}$. K is the absorption coefficient and, naturally, a function of the wavelength $\lambda$ of the radiation and of the specific characteristics of the absorbing medium, but not of l. Since absorbing along l depends only on the number of absorption centers or particles, the total number of absorption centers obviously is proportional to the product Cl, if C represents the concentration along l. With $K = K'C$, it follows that $\phi = \phi_o e^{-K'Cl}$. Accordingly, in this invention, a selected absorption effect can be obtained both in the case where the medium has a small concentration of absorption centers and great depth and in the case of a high concentration and small penetration depth.

BRIEF DESCRIPTION OF THE DRAWING

A complete understanding of the exact nature and structural detail of the invention can be obtained from the following detailed description when read in conjunction with the annexed drawing in which.

DESCRIPTION OF THE INVENTION

Figure 1:
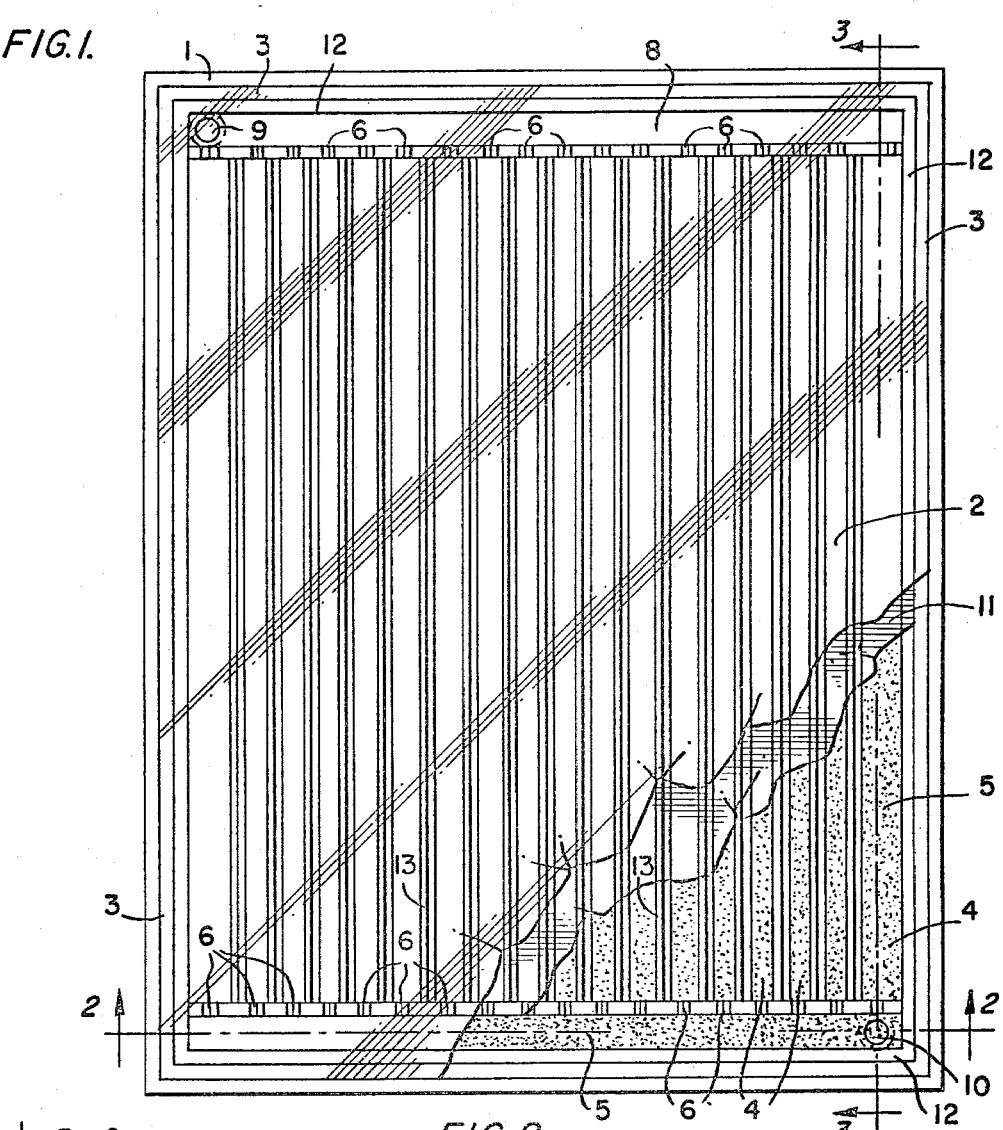
FIG. 1 is a top view of a first embodiment of the invention.
Figure 2:
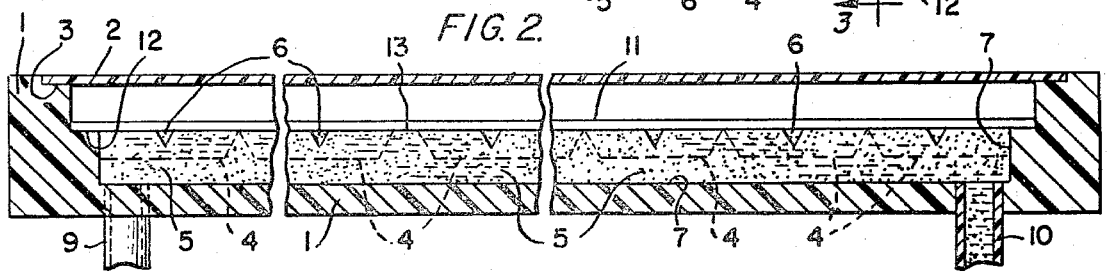
FIG. 2 is a transverse cross section of the first embodiment taken on line 2—2 of FIG. 1.
Figure 3:
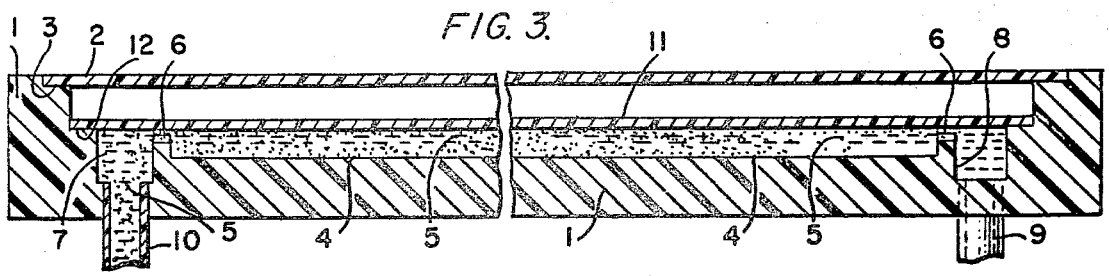
FIG. 3 is a longitudinal, in cross section, of the first embodiment taken along line 3—3 of FIG. 2.

FIGS. 1, 2, and 3 show a first embodiment of the invention. This embodiment is designed for flat or tilted deployment.

As shown in FIGS. 1, 2, and 3, this embodiment comprises a trough or housing 1 made of rigid insulating material such as polyurethane molded in one single piece and coated with a thin ultraviolet radiation and water resistant coating such as white epoxy primer and paint. The white color of the paint provides for maximum radiation reflection of all continually exposed surfaces and prevents overheating of the collector when the fluid is drained for repair purposes, for example. Further, when the collector of this embodiment is used as a roof mounted collector, housing or trough 1 enables assembly of several collectors to provide a waterproof roof structure. For example, the collectors may be provided either with leak tightened plastic strips interconnecting surrounding collector housings or outer edges of each collector housing may be molded to allow staggered deployment (or overcutting) similar to fired clay roof tiles. As various means of interconnection, well known in the prior art, may be utilized to assemble panels into a waterproof structure, no specific interconnection is shown in the drawings.

The open top trough 1 is enclosed by an outer transparent cover 2 made of glass or in hail storm or vandal prone areas of an impact resistant, rigid or flexible polymer sheet, such as LEXAN. Outer transparent cover 2 rests on and is secured to a ridge or plateau 3 formed in trough 1.

A plurality of parallel channels 4 extending along the length of trough 1 are secured inside trough 1. A black fluid 5 which serves as the absorber and heat carrier of the collector flows through channels 4. Black fluid 5 is fluid made up of suspension, dispersion or solution of radiation absorbing materials such as Carbon, Vailon and Acidol in the carrier fluid which can be water or any other suitable liquid, for example, glycerine in applications where a higher boiling point is desirable. Both ends of each channel 4 have a plurality of openings 6 which form a manifold inlet or outlet depending upon the flow direction of black liquid 5. Opening 6 in one end of each channel 4 communicate with the manifold channel 7 and opening 6 of the other end of each channel 4 communicate with identical manifold channel 8. The pipe 9 communicates with manifold channel 8 and the identical pipe 10 communicates with manifold channel 7. A feature of this invention is that it enables the use of low cost piping material, for example, readily available rigid PVC pipe of the type used in DWV plumbing applications. It will be appreciated that the minimal pressure constraints, characteristic of the invention enable the use of DWV piping, if desired. To insure proper flow for optimum efficiency, pipes 9 and 10 must be at diagonally opposite corners. Pipes 9 and 10 are shown as passing through the under surface of trough 1. It will be appreciated that the pipes 9 and 10 could, instead, pass through the side walls.

Figure 8:
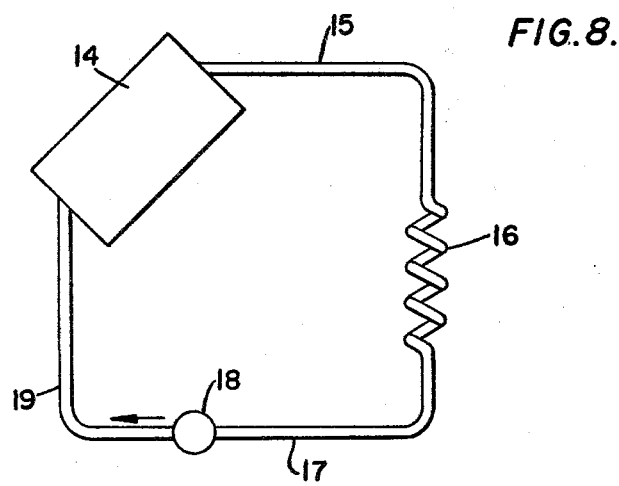
FIG. 8 is a schematic showing of a typical closed cycle solar energy system in accordance with the present invention.
Figure 9:
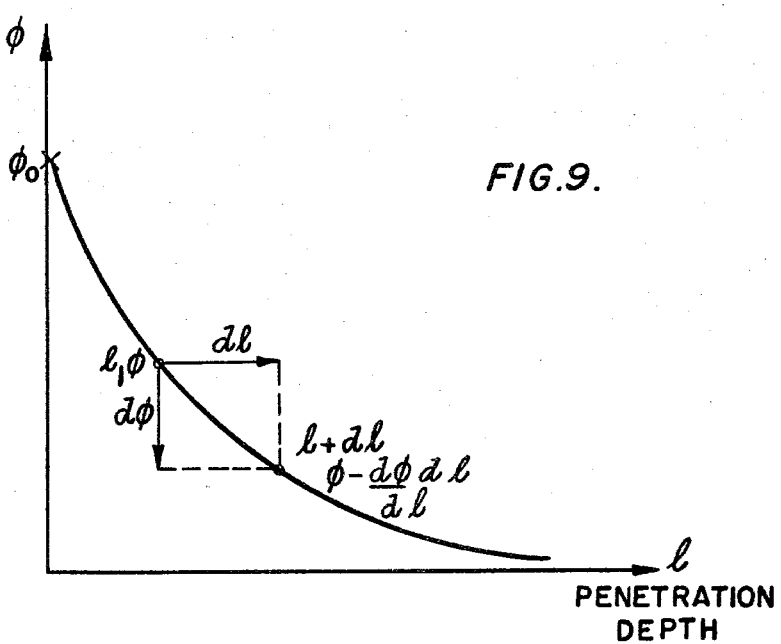
FIG. 9 is a graphical showing of the relationship of collector geometry and absorption center concentration in the fluid for total absorption.

An inner optically transparent inner glass cover 11 made of Float-glass or PYREX rests on and is sealed to the ridge of plateau 12 formed in trough 1. Inner glass cover 11 serves as an infra-red filter and as the top retaining cover for black fluid 5. By sealing inner glass cover 11 to plateau 12 provided in trough 1, protection against leakage of black fluid 5 from a closed cycle system such as the system shown in FIG. 8 is insured. Inner glass cover 11 also rests on and is sealed to a pair of widened ridges 13. Wide ridges 13 protect inner glass 11 from breakage due to sudden pressure of black fluid 5 during pumping initiation. While only two ridges 13 are shown any number of such ridges, conveniently uniformly spaced, can be provided. The space between inner glass cover 11 and outer cover 2 is a dead air space and the main functions of outer cover 2 are to provide this dead air space to minimize heat losses by convection and to lower losses of infra-red radiation energy.

The collector of FIGS. 1, 2 and 3 is typically used in a system such as the system shown in FIG. 8. In FIG. 8, the collector 14 represents one or more of the collectors of this invention. Thus, the collector of FIGS. 1, 2 and 3 may be collector 14 in FIG. 8. Assuming this is the case, conduit 19 would be coupled to the other pipes 9 or 10. A pump 18 pumps black fluid 5 in the direction indicated by the arrow. When the collector is deployed in a tilted fashion, black fluid 5 is pumped or thermosyphoned upward. If collector 14 were horizontal, black fluid 5 could be pumped in either direction. Thus, black fluid 5 passes through collector 14 in channels 4 in this case, since it is assumed that collector 14 is the collector of FIGS. 1, 2 and 3, and out of collector 14 via conduit 15. While black fluid 5 passes through collector 14, it absorbs the solar energy impinging on collector 14 and converts this solar radiation energy to thermal energy. The thermal energy is carried by black fluid 5 as sensible heat that is based on the black fluid's heat capacity via conduit 15 to heat exchanger 16 which extracts the heat from black fluid 5. Black fluid 5 with the heat extracted is carried to pump 18 via conduit 17. Pump 18 pumps black fluid 5 in the direction of the arrow back through collector 14 via conduit 19 for the next cycle. Thus, black fluid 5 acts not only as the absorber in the system of FIG. 8 but also as the vehicle for transporting the thermal energy to heat exchanger 16 (the point of use of the thermal energy).

Figure 4:
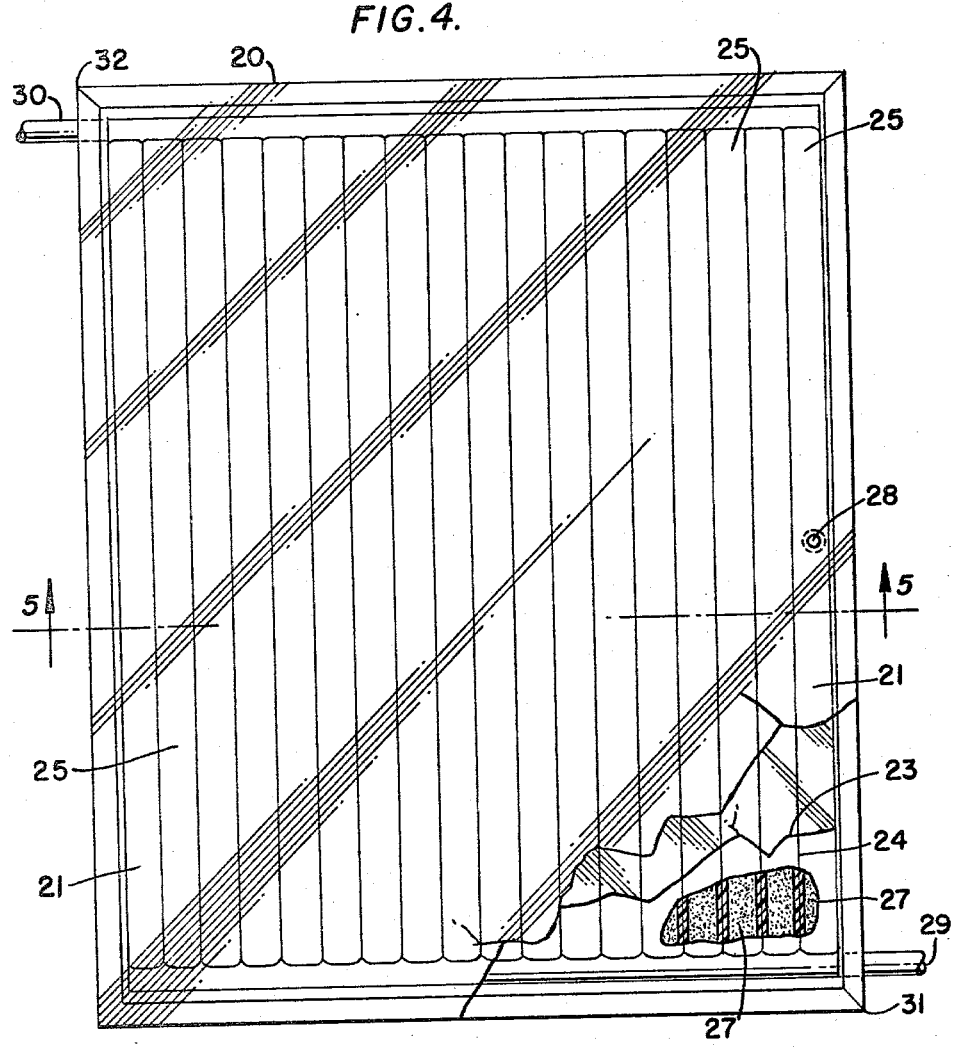
FIG. 4 is a top view of a second embodiment of the invention.
Figure 5:
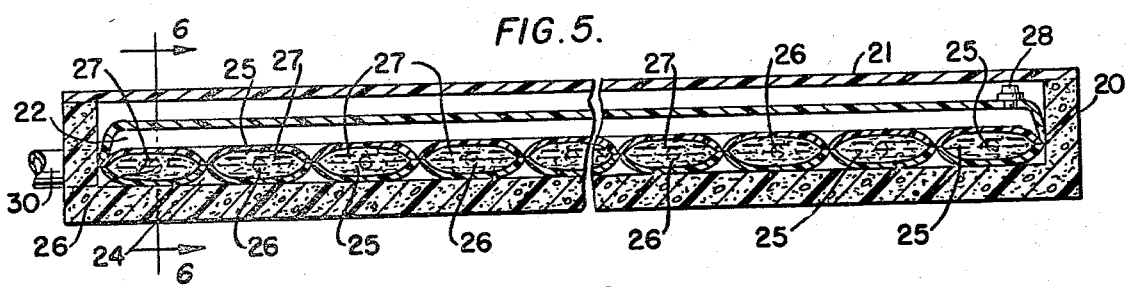
FIG. 5 is a transverse cross section, of the second embodiment taken along line 5—5 of FIG. 4.
Figure 6:
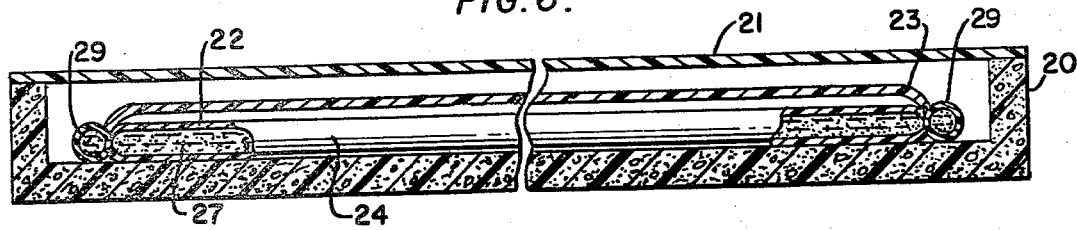
FIG. 6 is a longitudinal cross section, of the second embodiment taken along line 6—6 of FIG. 5.

Referring to FIGS. 4, 5, and 6, these Figures show a second embodiment of the invention. Again, a one-piece molded housing or trough 20 made of a rigid insulating material that has been weather and ultra-violet radiation proofed if provided. Housed inside trough or housing 20 is a specially designed, flat, transparent, and ultraviolet radiation resistant flexible polymer (polycarbonate, POLYVINYL, TEDLAR or the like) bag 22. Bag 22 consists of an inner bag 24 welded together at intervals to form the channels 25 and a cover 23 which covers the top of inner bag 24 and is secured on all four sides to inner bag 24 in such a manner that an air tight seal is formed. Cover 23 is made from a flexible transparent polymer and inner bag 24 also may be made from a flexible transparent polymer. Each of the channels 25 has a manifold at each end. In FIG. 5, the manifolds are indicated as the holes or openings 26. However, in this embodiment, the manifold design is not critical and any suitable manifold arrangement may be used. For example, separate holes or sleeves made of a material that is readily faced to the material of inner bag 24 could be secured to the ends of the channels 25. The holes and sleeves would be sealed at the end opposite the end secured bag 24 and would have a plurality of holes along their lengths. The manifold arrangements provided at each end of each of the channels 25 are either inlet manifolds at one end of channels 25 and outlet manifolds at the other end of channels 25 or vice-versa depending upon the direction of flow of the black fluid 27 which flows through the channels 25. Black fluid 27 is identical to black fluid 5 used in the first embodiment shown in FIGS. 1, 2 and 3, and also serves as both the absorber and vehicle for transporting the thermal energy to the point of use.

Trough or housing 20 is closed by means of a transparent top sheet 21 of flexible or rigid polymer that is secured along the entire top edge of trough or housing 20 but for primitive applications, no housing or top sheet are required. An air cushion is formed on the top of inner bag 24 by means of cover 23. An air valve 28 is provided in cover 23 to provide pressure control of the air pressure on inner bag 24 and thus channels 25.

A pipe or channel 29 communicates with the manifolds 26 at one end of channels 25 and a second pipe or channel 30 communicates with the manifolds at the other end of channels 25. In FIG. 6 the manifold pipe 29 is illustrated to be external to inner bag 24. Pipe 29 is carried out through one side of trough or housing 20 adjacent the corner 31 of trough or housing 20 and pipe 30 is carried out through the other side of trough or housing 20 adjacent the corner 32 of trough or housing 20, corners 31 and 32 being diagonally opposite corners.

Figure 7:
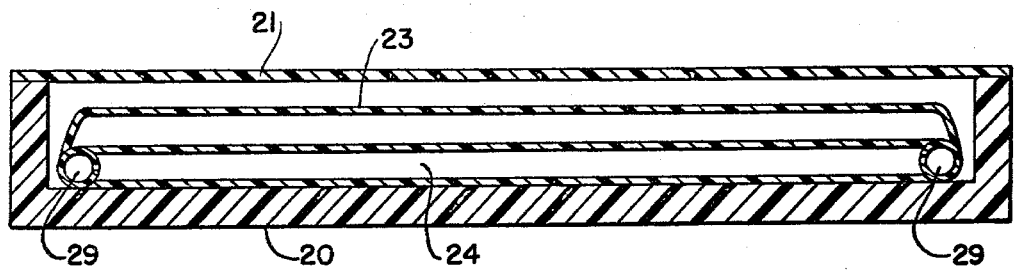
FIG. 7 is a longitudinal cross section, of a third embodiment of the invention.

FIG. 7 is a longitudinal cross section of a third embodiment of the invention. This third embodiment is merely a variation of the second embodiment of the invention; therefore, like numerals have been used to indicate like parts. In the embodiment, manifold pipe 29 is internal to inner bag 24. This merely requires a different sealing pattern.

The collectors of FIGS. 4, 5, 6 and 7 each alone or in combination might typically be used as collector 14 in a system such as the system of FIG. 8. The system of FIG. 8 operates in the same manner when the collector of FIGS. 4, 5, 6 and 7 is used for collector 14 as it does when the collector of FIGS. 1, 2 and 3 is used. Note, the collectors of FIGS. 4, 5, 6 and 7 will typically be used in a flat or horizontal position but may be used in slightly tilted positions at relatively small angles, if desired.

While the invention has been described with reference to several particular embodiments, it will be obvious to those skilled in the art that various changes and modifications can be made to each of the embodiments shown and described without departing from the spirit and scope of the invention as set forth in the claims.

What is claimed is:

1. A solar energy collector for radiant energy exposure of a selected fluid medium, having a high radiation absorption coefficient, in a low pressure, moving fluid, energy transfer system comprising:

an opaque back member of substantially planar and substantially rectangular configuration and a substantially transparent front member of substantially planar and substantially rectangular configuration in spaced relation with two parallel elongated side sections defining a hollow chamber with first and second open ends and having a substantially uniform front to back depth, said hollow chamber including a plurality of elongated divider means each extending from said first open end to said second open end and defining a plurality of channels within said hollow chamber;

first and second manifold means coupled to said first and second open ends, respectively, of said hollow chamber and defining a substantially rectangular fluid container adapted to contain said fluid medium, said manifold means including fluid input means associated with said first manifold means and disposed in the vicinity of a first corner of said substantially rectangular fluid container, and fluid output means associated with said second manifold means and disposed in the vicinity of a second corner diagonally opposite said first corner, said fluid input means and said fluid output means connected to said first and second manifold means, respectively, such that fluid entering and exiting respective manifolds thereby moves in a direction orthogonal to the direction of movement of fluid in said plurality of channels defined by said elongated dividers;

said fluid input means and said fluid output means connected to said energy transfer system such that said substantially rectangular fluid container is an integral element of said system with said fluid medium of said system moving therethrough, said substantially rectangular fluid container being the radiant energy exposure element of said system and disposed with said transparent front member oriented to receive radiant energy from the solar energy source, said fluid container adapted for full fluid operation and said front to back depth thereof being inversely proportional, for any given radiant energy intensity, to the radiation absorption coefficient of said fluid medium; said fluid medium in said container being contained within a flexible transparent polymer bag structure disposed between said front member and said back member thereof.

* * * * *